(12) United States Patent
Takeda et al.

(10) Patent No.: US 7,237,928 B2
(45) Date of Patent: Jul. 3, 2007

(54) VEHICLE HEAD LAMP

(75) Inventors: Hitoshi Takeda, Shizuoka-ken (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 79 days.

(21) Appl. No.: 11/061,359

(22) Filed: Feb. 18, 2005

(65) Prior Publication Data
US 2005/0180139 A1    Aug. 18, 2005

(30) Foreign Application Priority Data
Feb. 18, 2004   (JP) ............................. 2004-040790

(51) Int. Cl.
*F21V 23/04* (2006.01)
(52) U.S. Cl. .................. 362/276; 362/464; 362/475
(58) Field of Classification Search ............... 362/276, 362/464, 465, 466, 475, 800; 36/464; 340/468, 340/469, 475, 815.4
See application file for complete search history.

(56) References Cited

U.S. PATENT DOCUMENTS

| 5,237,404 A | * | 8/1993 | Tanaka et al. ............... 348/128 |
| 5,490,049 A | * | 2/1996 | Montalan et al. ............ 362/240 |
| 2002/0015308 A1 | | 2/2002 | Naganawa et al. |
| 2002/0196634 A1 | * | 12/2002 | Jeannot ....................... 362/464 |

FOREIGN PATENT DOCUMENTS

| DE | 197 27 701 A1 | 1/1999 |
| DE | 199 23 187 C2 | 11/2000 |
| DE | 101 04 773 A1 | 8/2001 |
| DE | 100 09 782 | 9/2001 |
| DE | 101 29 743 C2 | 1/2003 |
| DE | 102 05 779 A1 | 10/2003 |
| DE | 102 45 296 B3 | 5/2004 |
| DE | 20 2004 010 950 U1 | 11/2004 |
| EP | 1 500 553 A1 | 1/2005 |
| JP | 2002-231013 | 8/2002 |
| JP | 2003-503253 | 1/2003 |
| JP | 2003-503815 | 1/2003 |
| JP | 2003151317 A | 5/2003 |
| WO | WO01/01037 | 1/2001 |
| WO | WO 01/01038 | 1/2001 |

OTHER PUBLICATIONS

Patent Abstracts of Japan; Publication No. 2003151317A; Date of Publication: May 23, 2003 (1 page).
German Office Action dated Aug. 14, 2006; Application No. DE 10 2005 004 626.2 (w/translation) (7 pages).

* cited by examiner

*Primary Examiner*—Sandra O'Shea
*Assistant Examiner*—Mark Tsidulko
(74) *Attorney, Agent, or Firm*—Osha Liang LLP (57) ABSTRACT

A vehicle head lamp is disclosed for use in a vehicle, and includes a plurality of semiconductor light sources which differ in directions of radiation; an optical system disposed for common use by the plurality of semiconductor light sources; and a luminous energy control section for changing a ratio among luminous energies emitted by the respective semiconductor light sources in accordance with a vehicle-originated signal provided by a vehicle-side. In addition, the luminous energy control section may change the ratio among the luminous energy in accordance with a rotation angle by means of receiving a signal indicating a rotation angle of a steering wheel as the vehicle-originated signal.

7 Claims, 9 Drawing Sheets

VEHICLE HEAD LAMP

This application claims foreign priority based on Japanese Patent application No. 2004-040790, filed Feb. 18, 2004, the contents of which is incorporated herein by reference in its entirety.

BACKGROUND OF THE INVENTION

1. Field of the Invention

The present invention relates to a vehicle lamp.

2. Description of the Related Art

Conventionally, a vehicle lamp employing a light-emitting diode element is known (see, e.g., JP-A-2002-231013). In addition, some vehicle lamps employ a plurality of light-emitting diode elements for the purpose of, for instance, attaining desired light distribution.

In recent years, a technique for changing light distribution by means of changing an orientation of a light source or of an optical system has been adopted in, for instance, a vehicle headlamp. However, when the technique is applied to a vehicle lamp which employs a plurality of light-emitting diode elements, in some cases, a number of driving members are required for changing orientations of the respective light sources or those of the respective optical systems corresponding to the light sources. This has often resulted in an increase in cost of the vehicle lamp.

SUMMARY OF THE INVENTION

The present invention aims at providing a vehicle lamp which can solve the above problem. This object can be achieved by combinations of features described in the independent claim. The dependent claims define further advantageous specific embodiments of the invention.

To solve the above problem, the vehicle lamp according to a first mode of the present invention is a vehicle lamp for use in a vehicle, and includes a plurality of semiconductor light sources which differ from each other in terms of illumination direction; an optical system disposed for common use by the plurality of semiconductor light sources; and a luminous energy control section for changing a ratio among luminous energies emitted by the respective semiconductor light sources in accordance with a vehicle-originated signal output from the vehicle.

In addition, the luminous energy control section may change the ratio among luminous energies in accordance with a rotation angle of a steering wheel of the vehicle upon receipt of the vehicle-originated signal indicating the rotation.

In addition, the luminous energy control section may change the ratio among luminous energies in accordance with a vehicle speed determined by the vehicle-originated signal which is indicating the vehicle speed.

Furthermore, the luminous energy control section may increase the luminous energies of the semiconductor light sources in accordance with, for instance, a predetermined variation range of the vehicle-originated signal.

In addition, at least a region of the optical system may change directions of light beams from the respective semiconductor light sources.

The summary of the invention does not include descriptions about all essential features of the present invention. Sub-combinations of these features also constitute the present invention.

DESCRIPTION OF THE PREFERRED EMBODIMENTS

The invention will be described on the basis of the embodiments; however, the embodiments provided below do not limit the scope of the present invention as set forth in the appended claims. In addition, not all the combinations of the features described in the embodiments are indispensable to means for resolution of the invention.

Figure 1:
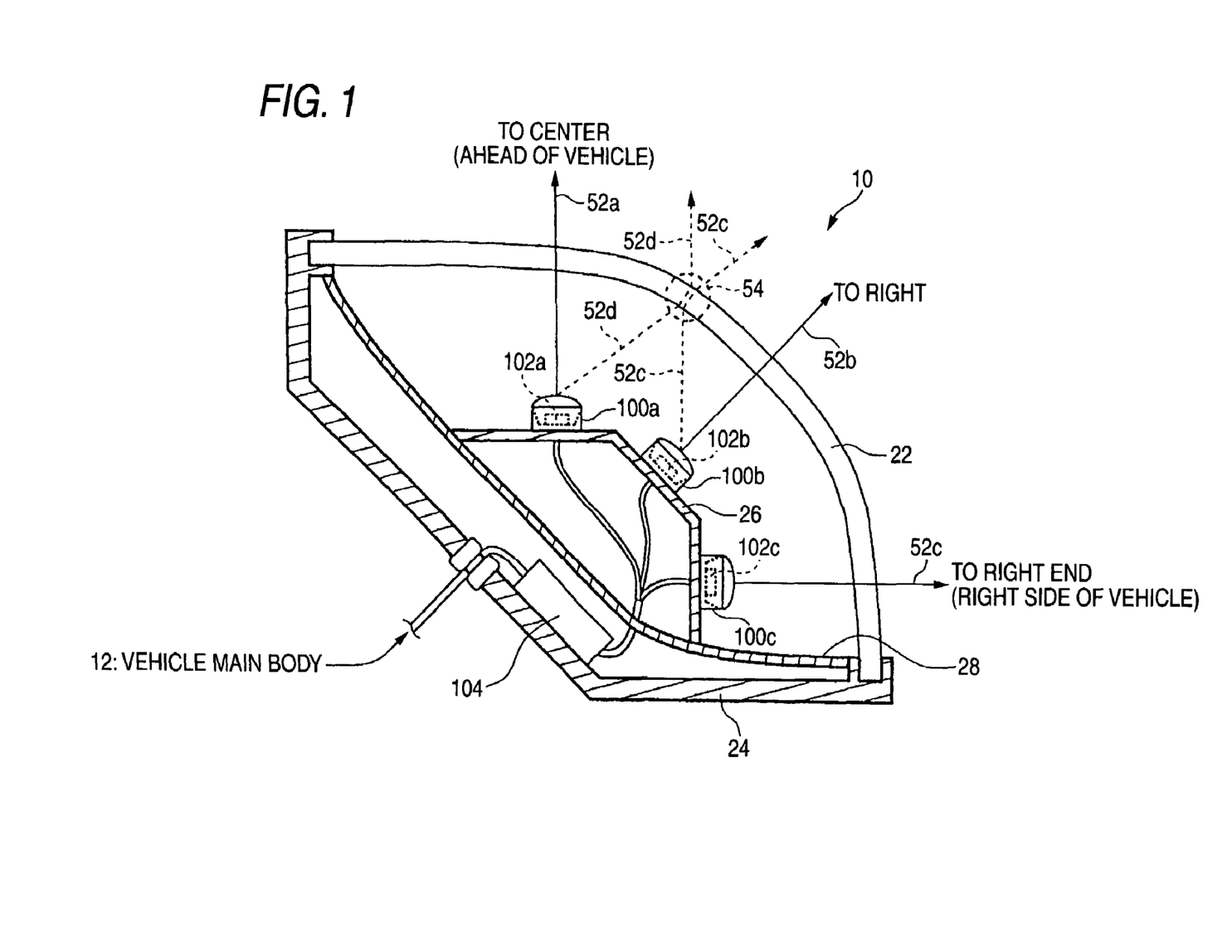
FIG. 1 is a horizontal cross-sectional view showing an example configuration of a vehicle lamp 10 according to an embodiment of the present invention.

FIG. 1 is a horizontal cross-sectional view showing an example of the configuration of a vehicle lamp 10 according to an embodiment of the present invention. The embodiment aims at providing the vehicle lamp 10 which can change light distribution at low cost. The vehicle lamp 10 of the embodiment is an additional illumination lamp attached to the right side on the front of a vehicle. The vehicle lamp 10 includes a light source support section 26, a plurality of light source modules 100a to 100c, an outer lens 22, a lamp body 24, an extension reflector 28, and a luminous energy control section 104.

The plurality of light source modules 100a to 100c are supported by the light source support section so as to face different directions, respectively. In the embodiment, the light source module 100a is supported by the light source support section 26 so as to face forward and towards the center of the vehicle). The light source module 100c is supported by the light source support section 26 so as to face toward the right (furthest rightward). The light source module 100b is supported by the light source support section 26 so as to face in the rightward oblique direction, ahead of the vehicle (toward the right); i.e., so as to be oriented between the center and the right end.

Each of the plurality of light source modules 100a to 100c has a corresponding semiconductor light source 102a to 102c, and radiates light emitted by the corresponding semiconductor light source 102 toward a direction in which it faces. Accordingly, the plurality of semiconductor light sources 102a to 102c differ from each other in terms of illumination direction in correspondence with the orientations of the respective light source modules 100.

For instance, the semiconductor light source 102a radiates light toward the center as shown by an arrow 52a. The semiconductor light source 102b radiates light toward the rightward oblique direction as shown by an arrow 52b. The semiconductor light source 102c radiates light toward the right end as shown by an arrow 52c. Meanwhile, each of the arrows 52a to 52c indicates a direction of an optical axis of the corresponding semiconductor light source 102. Each of the semiconductor light sources 102 may radiate light toward a region surrounding the corresponding arrow 52b. In addition, each of the semiconductor light sources 102 in the embodiment is a light-emitting diode element. Each of the semiconductor light sources 102 is preferably a light source which is capable of graduated illumination.

The outer lens 22 is an example of an optical system disposed for common use by the plurality of the semiconductor light sources 102a to 102c, and is formed from a translucent material in such a manner as to cover the plurality of semiconductor light sources 102a to 102c from the front of the vehicle. The outer lens 22 in the embodiment has a lens step in at least a region thereof. When light from any of the semiconductor light sources 102 enters the lens step, the lens step deflects the thus-entered light.

For instance, a lens step formed in a region 54 deflects light beams having been entered from the respective semiconductor light sources 102a, 102b as shown by arrows 52d, 52e, which are formed from dotted lines. Accordingly, at least a portion of the outer lens 22 changes the directions of light beams from the respective semiconductor light sources 102.

Alternatively, in another embodiment, the outer lens 22 may be a non-deflecting translucent lens. In addition, as an optical system disposed for common use by the plurality of semiconductor light sources 102a to 102c, the vehicle lamp 10 may have, for instance, a reflection mirror. In this case, at least a region of the reflection mirror changes the direction of light beams having entered from the respective semiconductor light sources 102.

The lamp body 24 and the outer lens 22 form a lamp chamber of the vehicle lamp 10, and house the plurality of light source modules 100a to 100c therein. Therefore, the lamp body 24 renders the semiconductor light sources 102 waterproof and protects the same.

The extension reflector 28 is formed in such a manner as to cover the plurality of semiconductor light sources 102a to 102c from behind, thereby hiding a gap in the rear of the semiconductor light sources 102. Therefore, the extension reflector 28 enhances the appearance of the vehicle lamp 10.

The luminous energy control section 104 receives a vehicle-originated signal indicating a driving condition of the vehicle and the like from a vehicle main body 12 side, and performs illumination control of the plurality of semiconductor light sources 102a to 102c on the basis of the vehicle-originated signal. For instance, the luminous energy control section 104 changes a ratio among luminous energies emitted by the respective semiconductor light sources 102a to 102c in accordance with the vehicle-originated signal.

Hereinafter, operations of the vehicle lamp 10 will be described in more detail. In the embodiment, the luminous energy control section 104 receives, as a vehicle-originated signal, a signal indicating a rotation angle of a steering wheel of the vehicle. Accordingly, the luminous energy control section 104 changes the ratio among the luminous energies emitted from the respective semiconductor light sources 102a to 102c in accordance with the rotation angle of the steering wheel.

For instance, when the rotation angle of the steering wheel is 0, and the vehicle drives forward in a straight line, the luminous energy control section 104 extinguishes all the semiconductor light sources 102a to 102c. When the steering wheel is turned toward the right, the luminous energy control section 104 causes the luminous energy emitted from the semiconductor light source 102a to gradually increase in accordance with an increase in the rotation angle of the steering wheel. Accordingly, the vehicle lamp 10 causes light directed toward the center to gradually increase in luminous energy.

In addition, when the rotation angle of the steering exceeds a predetermined angle, the luminous energy control section 104 causes the semiconductor light source 102b to illuminate. When the steering wheel is turned further toward the right, the luminous energy control section 104 causes the luminous energy emitted by the semiconductor light source 102b to gradually increase in accordance with an increase in the rotation angle of the steering wheel. Accordingly, the vehicle lamp 10 causes light emitted toward the right to gradually increase.

In addition, when the rotation angle of the steering wheel is turned further toward the right by a predetermined angle after illumination of the semiconductor light source 102b, the luminous energy control section 104 further causes the semiconductor light source 102c to illuminate. The luminous energy control section 104 causes the luminous energy emitted by the semiconductor light source 102c to gradually increase in accordance with an increase in the rotation angle of the steering wheel. Accordingly, the vehicle lamp 10 causes light toward the right end to gradually increase in luminous energy.

As a result, the vehicle lamp 10 changes light distribution in accordance with the rotation angle of the steering wheel. In this case, for instance, the appearance of light distribution of the vehicle lamp 10 can be rendered as if the light distribution has been moved from a center-oriented distribution to a right-oriented distribution. Therefore, according to the embodiment, the vehicle lamp 10 is of high commercial value.

Alternatively, in another embodiment, the vehicle lamp 10 may be attached to the left side on the front of the vehicle. In this case, the luminous energy control section 104 controls the plurality of semiconductor light sources 102a to 102c in accordance with a leftward rotation angle of the steering wheel. Furthermore, the vehicle lamp 10 may be, for instance, another vehicle lamp, such as a side-marker lamp.

The luminous energy control section 104 may receive, as a vehicle-originated signal, information which indicates activation of a turn signal, wheel speed, vehicle height, vehicle posture, exterior luminance detected by an luminance sensor, and the like. The luminous energy control section 104 may receive a vehicle-originated signal on the basis of a combination of the above information. For instance, the luminous energy control section 104 may receive a vehicle-originated signal on the basis of a combination of a rotation angle of the steering wheel and vehicle velocity.

Furthermore, the luminous energy control section 104 may receive a vehicle-originated signal from a vehicle navigation system, an infrared camera, or a sensor disposed in another vehicle. In this case, the luminous energy control section 104 receives a vehicle-originated signal indicating, for instance, positional information provided by the vehicle navigation system, an obstacle and the like detected by the infrared camera, or the sensor in another vehicle.

In relation to the above, as a method for changing the light distribution of the vehicle lamp 10, the following method is also conceivable. Namely, a method in which graduated illumination of the semiconductor light sources 102 is not used, but the semiconductor light sources 102 having been arranged are caused to illuminate in sequence. However, when such a method is adopted, in some cases a number of semiconductor light sources 102 are required for attaining smooth change of the light distribution, thereby increasing cost of the vehicle lamp 10.

In one embodiment, the luminous energy control section 104 causes the luminous energy of the semiconductor light sources 102 to gradually increase through utilization of graduated illumination of the semiconductor light sources 102. Therefore, according to an embodiment, even when a small number of semiconductor light sources 102 are employed, the light distribution formed by the vehicle lamp 10 can be changed smoothly.

Alternatively, in another embodiment, there is employed a method of changing the light distribution of the vehicle lamp 10 by means of actually changing orientations of the semiconductor light sources 102 by means of, for instance, driving members. However, in the vehicle lamp 10 including use of the plurality of semiconductor light sources 102, a number of driving members are required for changing respective orientations of the semiconductor light sources 102, thereby, in some cases, increasing cost of the vehicle lamp 10.

Furthermore, a method of actually changing an orientation of the vehicle lamp 10, thereby changing the light distribution of the vehicle lamp 10, is also conceivable. However, when the semiconductor light sources 102 are employed, in some cases weight of the vehicle lamp 10 increases due to, for instance, provision of a heat sink member for dissipating heat of the semiconductor light sources 102. Accordingly, in such cases, the cost of a driving member may increase the cost of the vehicle lamp 10.

However, in an embodiment, the light distribution of the vehicle lamp 10 is changed by means of changing the luminous energy of each of the plurality of semiconductor light sources 102 without changing orientations of the same, and the like. As a result, according to the embodiment, the vehicle lamp 10 is of high commercial value and can be provided at low cost.

Figure 2:
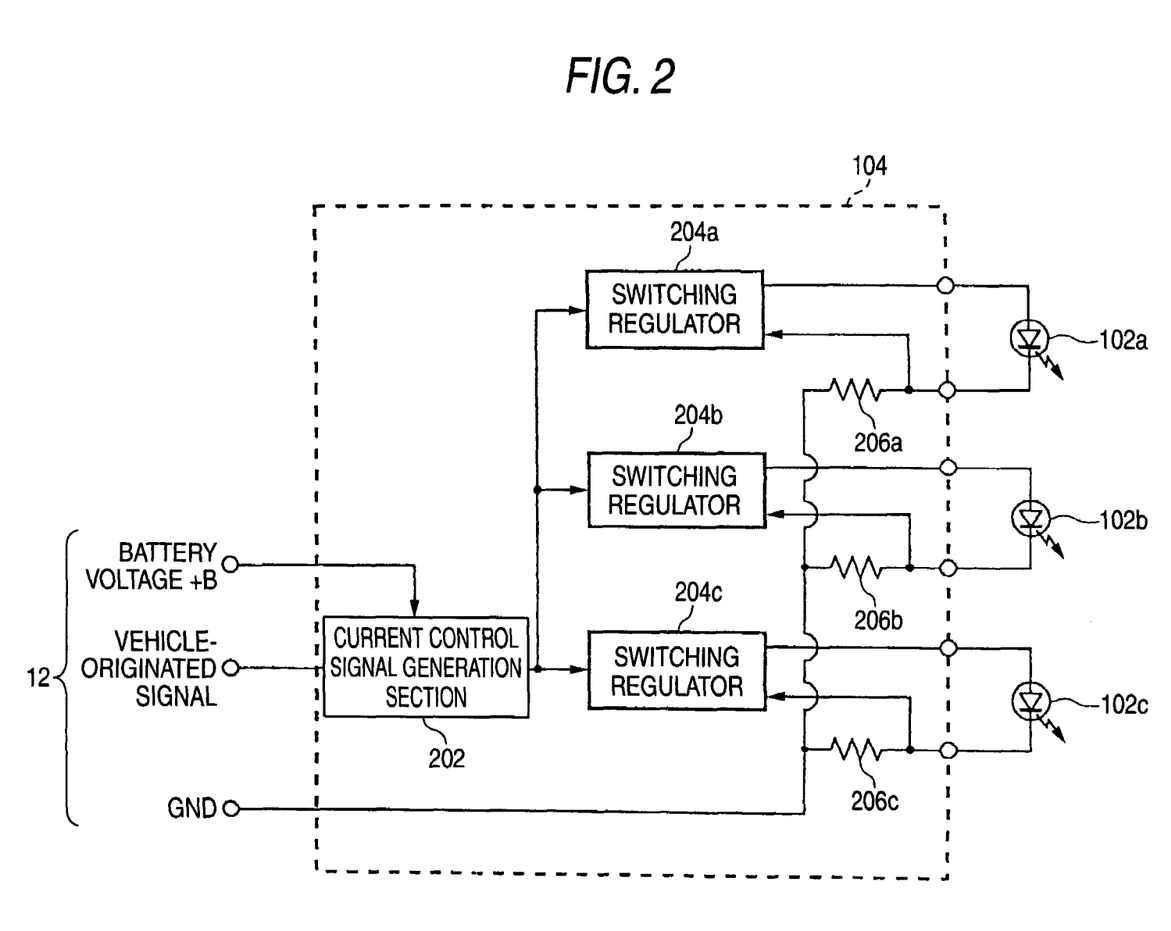
FIG. 2 is a view showing an example configuration of a luminous energy control section 104 in accordance with an embodiment of the invention.

FIG. 2 shows an example configuration of the luminous energy control section 104 used in combination with the plurality of semiconductor light sources 102a to 102c. The luminous energy control section 104 in the embodiment has a current control signal generation section 202, a plurality of resistors 206a to 206c, and a plurality of switching regulators 204a to 204c.

The current control signal generation section 202 determines current values to be supplied to the respective semiconductor light sources 102 on the basis of the vehicle-originated signal. The current control signal generation section 202 imparts the values to the respective switching regulators 204 corresponding to the respective semiconductor light sources 102. In addition, the current control signal generation section 202 applies an output voltage +B of an in-vehicle battery to the switching regulators 204.

The plurality of resistors 206a to 206c and the plurality of switching regulators 204a to 204c are disposed in correspondence with the plurality of semiconductor light sources 102a to 102c. Each of the resistors 206 is connected to the corresponding semiconductor light source 102 in series, thereby generating between ends of the resistor 206 a voltage corresponding to a current flowing through the semiconductor light source 102. Each of the switching regulators 204 supplies to the corresponding semiconductor light source 102 current of the value specified by the current control signal generation section 202. In this case, the switching regulator 204 detects current flowing through the corresponding semiconductor light source 102 on the basis of the voltage between ends of the corresponding resistor 206. Thereafter, by means of feedback control, the switching regulator 204 changes its output so that the current attains the value specified by the switching regulator 204. Therefore, according to an embodiment, signals to be supplied to the respective semiconductor light sources 102a to 102c can be changed in accordance with the vehicle-originated signal. In addition, by virtue of this, the luminous energy of each of the semiconductor light sources 102 can be changed in accordance with the vehicle-originated signal.

Meanwhile, the switching regulators 204 may supply electric power to the respective semiconductor light sources 102. The plurality of semiconductor light sources 102 may be connected in series and/or in parallel. In this case, the current control signal generation section 202 independently changes the luminous energies of the plurality of semiconductor light sources 202 corresponding to the respective switching regulators 204.

Alternatively, the switching regulators 204 may be operated on the basis of such a voltage control as to maintain an output voltage constant. The current control signal generation section 104 may include a constant-current circuit or a low-voltage circuit in place of the switching regulator 204.

Figure 3A:
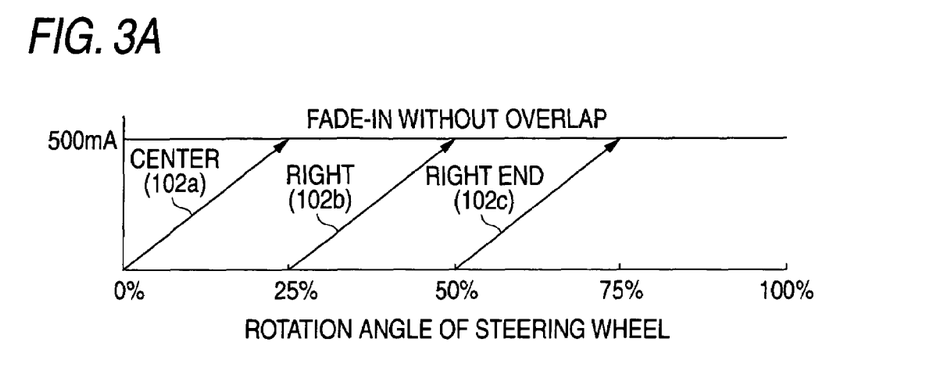
FIGS. 3A to 3C are views explaining example operations of a vehicle lamp 10 in accordance with an embodiment of the invention.
Figure 3B:
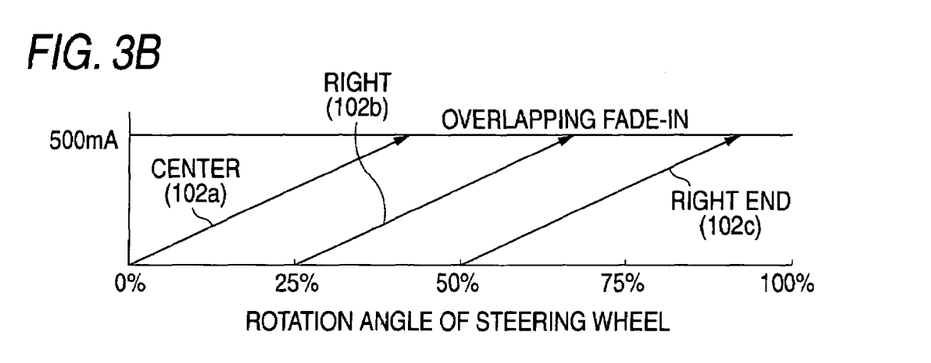
Figure 3C:
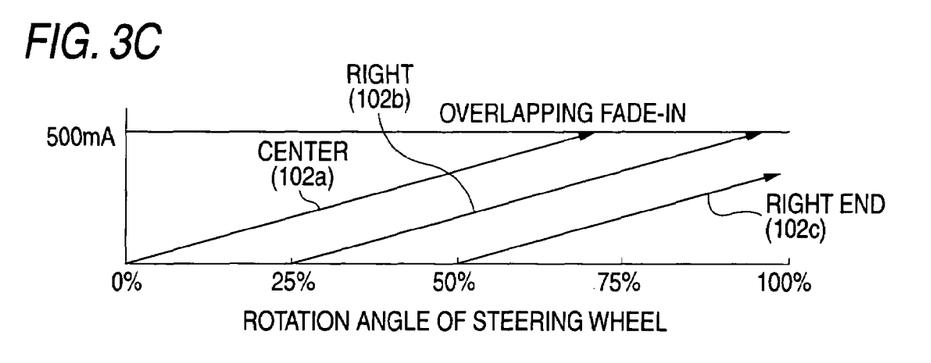

FIGS. 3A to 3C are views explaining example operations of the vehicle lamp 10. Meanwhile, in the graphs shown in FIGS. 3A to 3C, the rotation angle of the steering wheel, which is an example of information indicated by the vehicle-originated signal, is expressed in a ratio in relation to a rightward maximum rotation angle. In addition, the semiconductor light source 102 in the embodiment has a maximum current of approximately 700 mA. Accordingly, in relation to a current value of 500 mA or lower, which is sufficiently small in relation to the maximum current value, each of the semiconductor light sources 102 emits light whose luminous energy is substantially proportional to the current value.

For instance, in the case shown in FIG. 3A, when the rotation angle of the steering falls within a range of 0 to 25%, in accordance with a gradual increase in the same, the luminous energy control section 104 causes current to be supplied to the semiconductor light source 102a which is oriented toward the center to gradually increase to 500 mA, which is the predetermined upper limit current value. The semiconductor light source 102a emits light of the thus-increasing luminous energy in accordance with the current. In this case, the luminous energy control section 104 maintains at 0 mA a value of current to be supplied to the other semiconductor light sources 102b and 102c.

Furthermore, when the rotation angle of the steering falls within a range of 25 to 50%, in accordance with gradual increase in the same, the luminous energy control section 104 causes the luminous energy of the semiconductor light source 102b which is oriented toward the right oblique direction to gradually increase to a value corresponding to the upper limit current value. In this case, the luminous energy control section 104 maintains at 0 mA current to be supplied to the semiconductor light source 102c. In addition, the luminous energy control section 104 maintains at the maximum current value current to be supplied to the semiconductor light source 102*a*. Alternatively, the luminous energy control section 104 may maintain at 0 mA a value of current to be supplied to the semiconductor light source 102*a*.

When the rotation angle of the steering falls within a range of 50 to 75%, in accordance with gradual increase in the same, the luminous energy control section 104 causes the luminous energy of the semiconductor light source 102*c* which is oriented toward the right to gradually increase to the value corresponding to the upper limit current value. In this case, the luminous energy control section 104 maintains at the maximum current value current to be supplied to the other semiconductor light sources 102*a* and 102*b*.

As described above, the luminous energy control section 104 sequentially illuminates the plurality of semiconductor light sources 102*a* to 102*c* so as to fade-in without overlap. Accordingly, the light distribution of the vehicle lamp 10 can be caused to change as if the light distribution has been moved from a center-oriented distribution to a right-oriented distribution. Meanwhile, when the rotation angle of the steering wheel exceeds 75%, the luminous energy of the semiconductor light sources 102*c* may be maintained at the value corresponding to the upper limit current value.

In the case shown in FIG. 3B, when the rotation angle is smaller than a predetermined angle which is greater than 25%, the luminous energy control section 104 causes the luminous energy of the semiconductor light source 102*a* to gradually increase to the luminous energy corresponding to the upper limit current value. In this case, from a point in time when the rotation angle reaches 25% and while the semiconductor light source 102*a* increases in luminous energy, the luminous energy control section 104 causes the semiconductor light source 102*b* to start illuminating. When the rotation angle is smaller than a predetermined angle which is greater than 50%, the luminous energy control section 104 causes the luminous energy of the semiconductor light source 102*b* to gradually increase to that corresponding to the upper limit current value. In this case, when the rotation angle reaches 50%, the luminous energy control section 104 causes the semiconductor light source 102*c* to start illuminating.

Accordingly, in this case, the luminous energy control section 104 sequentially illuminates the plurality of semiconductor light sources 102*a* to 102*c* so as to fade-in with overlap. As a result, the change in light distribution of the vehicle lamp 10 can be rendered smooth.

In a case shown in FIG. 3C, when the rotation angle is smaller than a predetermined angle which is greater than 50%, the luminous energy control section 104 causes the luminous energy of the semiconductor light source 102*a* to gradually increase. In this case, from a point in time when the rotation angle reaches 25%, the luminous energy control section 104 causes the semiconductor light source 102*b* to start illuminating. In addition, from a point in time when the rotation angle reaches 50%, the luminous energy control section 104 causes the semiconductor light source 102*c* to start illuminating. In this case, the change in light distribution of the vehicle lamp 10 can be rendered further smooth.

In relation to the above, in another embodiment, the rotation angle at which the semiconductor light source 102*a* starts illuminating can be offset. In this case, when the rotation angle reaches a predetermined angle which is greater than 0%, the luminous energy control section 104 starts illumination of the semiconductor light source 102*a*.

In addition, when the steering wheel is returned from the right to the center, in accordance with gradual decrease in the rotation angle, the luminous energy control section 104 may extinguish each of the plurality of semiconductor light sources 102*a* to 102*c* while fading them out in a manner opposite that in the case where the rotation angle increases.

In addition, the luminous energy control section 104 may change the luminous energies of the semiconductor light sources 102 with a delay of a predetermined time period from a point in time when the rotation angle of the steering is changed. In this case, the time delay may differ between the case where the rotation angle increases and the case where the same decreases. For instance, in a case where the steering wheel is returned to thus decrease the rotation angle, the luminous energy control section 104 may change the luminous energies of the semiconductor light sources 102 by means of including a longer delay than in a case where the steering wheel is turned to thus increase the rotation angle.

In addition, some vehicle lamps 10 utilize a microcomputer for use in, for instance, controlling the switching regulators 204. In this case, control for causing the luminous energy of the semiconductor light sources 102 to fade-in may be performed by use of the microcomputer. Accordingly, commercial value of the vehicle lamp 10 can be enhanced without increasing the cost of the same.

Meanwhile, the luminous control section 104 may perform any of the control schemes shown in FIGS. 3A to 3C, which has been selected in advance. The luminous control section 104 may perform any one of control schemes shown in FIGS. 3A to 3C selected therefrom on the basis of, for instance, an instruction from a user. According to the embodiment, the vehicle lamp 10 is of high commercial value.

Furthermore, in addition to having the semiconductor light sources 102*a* to 102*c*, the vehicle lamp 10 may include other light sources which illuminate with luminous energy which does not depend on the rotation angle of the steering wheel. The semiconductor light sources 102*a* to 102*c* may be light sources for some exclusive use, such as turn signals for pending (for intersections), those for traveling along a curved road, those for high-speed driving, or those for wet-weather driving.

Figure 4A:
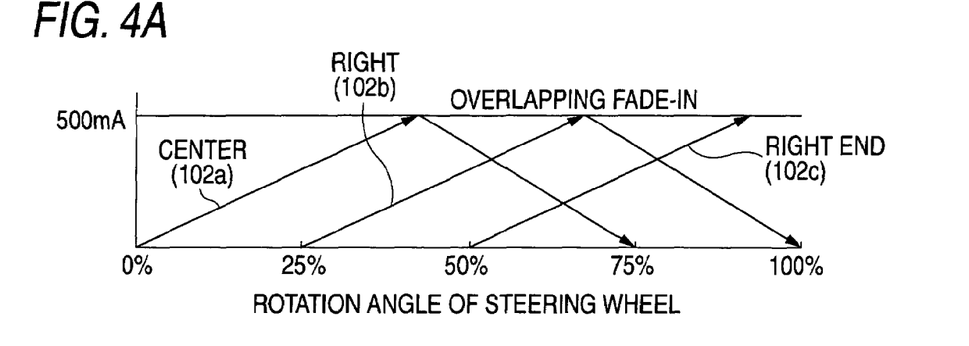
FIGS. 4A and 4B are views explaining other example operations of the vehicle lamp 10 in accordance with an embodiment of the invention.
Figure 4B:
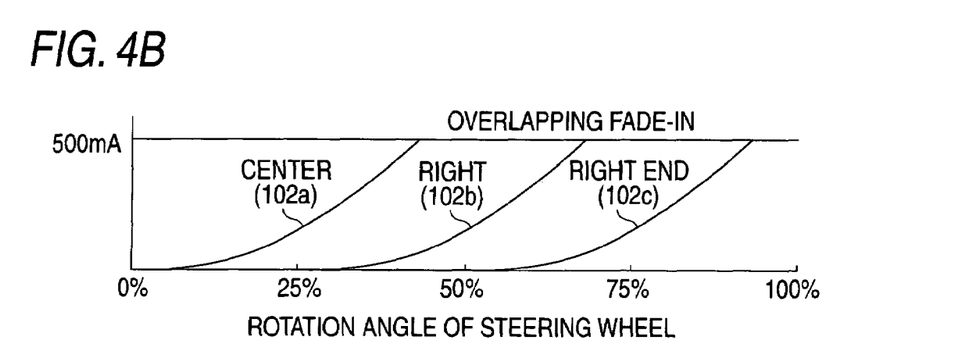

FIGS. 4A and 4B are views explaining other example operations of the vehicle lamp 10. In a case shown in FIG. 4A, the luminous energy control section 104 causes the luminous energy of the semiconductor light sources 102 to temporarily increase to that corresponding to the maximum current value, and to gradually decrease thereafter in accordance with a further increase in the rotation angle of the steering wheel as specified by the vehicle-originated signal. Accordingly, moving of the light distribution from a center-oriented distribution to a right-end oriented distribution can be made to look further natural. Furthermore, by means of reducing the number of the semiconductor light sources 102 to be illuminated simultaneously, power consumption of the vehicle lamp 10 can be reduced.

Meanwhile, when the luminous energy of one of the semiconductor light sources 102 has reached the level corresponding to the upper limit current value, the luminous energy control section 104 may extinguish the semiconductor light source 102 in a fade-out manner after causing the same to illuminate with this luminous energy during a time period corresponding to a predetermined rotation angle. In addition, the luminous energy control section 104 may cause the semiconductor light source 102 to fade-out at a gradient differing from that used for fade-in.

In a case shown in FIG. 4B, the luminous energy control section 104 causes the luminous energies of the semiconductor light sources 102 to change at a gradient which differs depending on the rotation angle. For instance, when a steering angle, corresponding to each of the semiconductor light sources 102, increases, the luminous energy control section 104 causes the luminous energy of the corresponding semiconductor light source 102 to change with greater rate of the variation. Accordingly, the luminous energy control section 104 increases the rate of the luminous energy of each of the semiconductor light sources 102 in accordance with a predetermined variation in the vehicle-originated signal being increased.

In relation to the above, a case where current of the semiconductor light source 102 is changed from 0 mA to 100 mA is compared with a case where the same is changed from 400 mA to 500 mA. In the former case, the luminous energy increases from an extinguished state; in contrast, in the latter case, the luminous energy increases only by about 25% from a state which has been bright from the start. Therefore, in some cases, in spite of the luminous energy varying by the same amount of 100 mA, the human eye senses a greater variation in the former case, where luminous energy in the original state is small.

However, in the embodiment, change in the luminous energy of the semiconductor light sources 102 can be rendered more natural by means of changing the gradient of the variation in the luminous energy (or rate of the luminous energy) in accordance with the luminous energy. In addition, by virtue of the above, the change in the light distribution of the vehicle lamp 10 can be rendered further smooth. Therefore, according to the embodiment, the vehicle lamp 10 is of further increased commercial value.

Further, this invention also makes it possible to realize the smooth lighting control for the human eyes in the same way as described above even in the case of the lighting energy being decreased from the bright state to the extinguished state. For instance, if the vehicle lamp of the present invention is used as the bending lamp, then the luminous energy of the bending lamp might be increased gradually from the extinguished state to the bright state at the timing of the vehicle approaching a corner of the road, during which the luminous energy shows the same tendency of the graph curve as described in FIG. 4B. On the other hand, after passing away the corner, it is desirable for the bending lamp to decrease its luminous energy gradually from bright state to the extinguished state in accordance with the vehicle speed being increased. Concerning the lighting control in this timing, the luminous energy control section 104 is controlled in such a way that the rate of the luminous energy of each of the semiconductor light sources 102 is decreased in accordance with a predetermined variation in the vehicle-originated signal being increased. It is noted that in this embodiment the relationship between the predetermined variation in the vehicle-originated signal and the luminous energy has been explained by referring to the analogue graph curve, however, the same effects in this invention can be also achieved by performing the step voltage control or digital control instead of analogue control.

Figure 5:
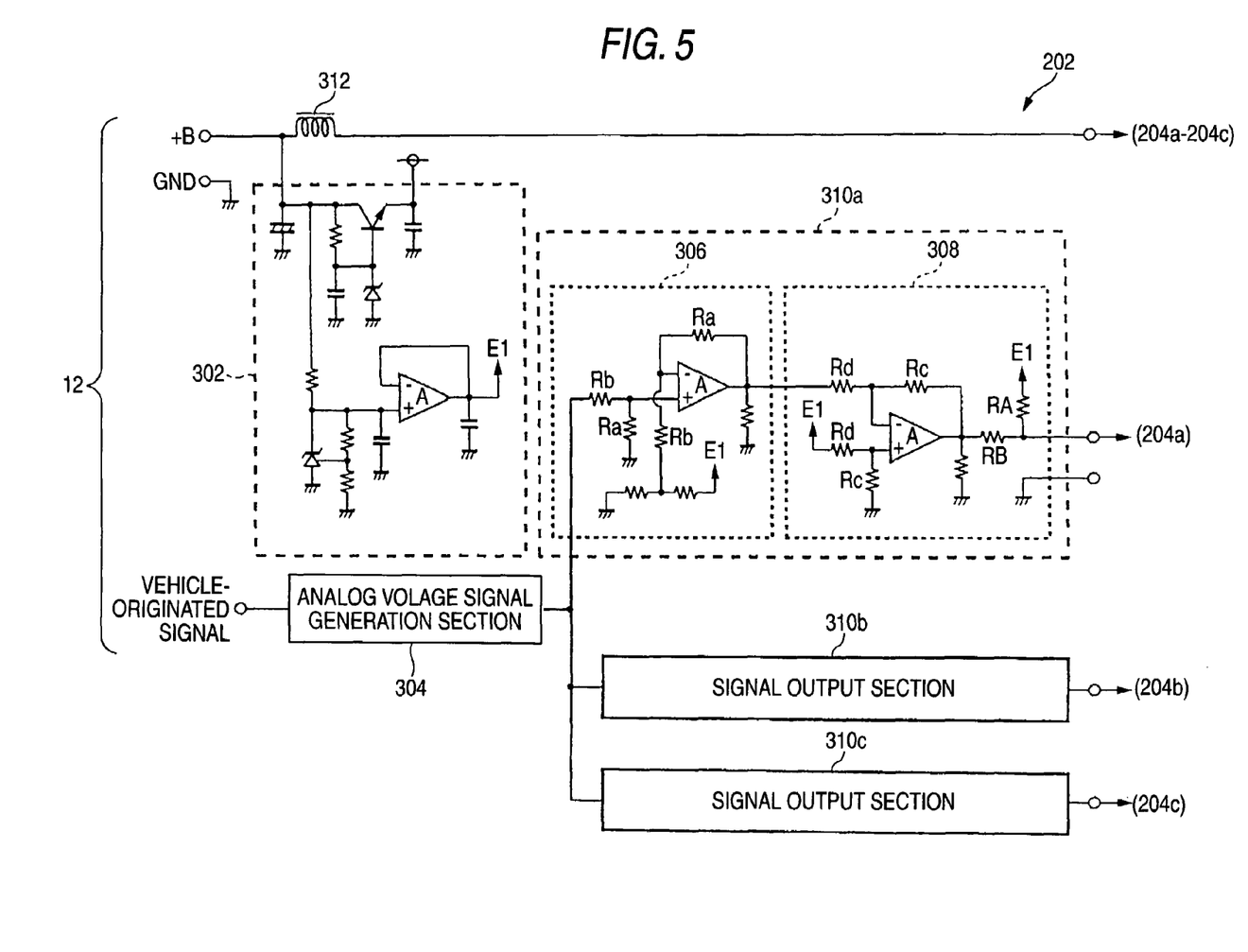
FIG. 5 is a view showing an example configuration of a current control signal generation section 202 in accordance with an embodiment of the invention.

FIG. 5 shows an example configuration of the current control signal generation section 202. In the present embodiment, the current control signal generation section 202 includes a coil 312, a reference voltage generation section 302, an analog voltage signal generation section 304, and a plurality of signal output sections 310a to 310c.

The coil 312, which is a noise filter, supplies the battery voltage +B having been received from the outside of the vehicle lamp 10 to the switching regulators 204a to 204c.

The reference voltage generation section 302 causes the battery voltage +B to drop, thereby generating a predetermined reference voltage E1.

The analog voltage signal generation section 304 generates an analog voltage on the basis of the vehicle-originated signal, thereby supplying the same to the plurality of signal output sections 310a to 310c. The analog voltage signal generation section 304 in the embodiment receives a digital signal indicating a rotation angle of the steering wheel as a vehicle-originated signal, thereby outputting an analog voltage which is proportional to the rotation angle of the steering wheel. The analog voltage signal generation section 304 may receive, as the digital signal, for instance, a pulse signal of a frequency which is proportional to the rotation angle of the steering wheel.

Each of the plurality of signal output sections 310a to 310c includes a first differential amplifying section 306 and a second differential amplifying section 308. Each of the first differential amplifying section 306 and the second differential amplifying section 308 includes an operational amplifier, and a plurality of resistors. The operational amplifier of the first differential amplifying section 306 receives a divided voltage of the reference voltage E1 through an inverting input terminal, and receives the analog voltage output by the analog voltage signal generation section 304 through a non-inverting input terminal. Accordingly, the operational amplifier reverses an output depending on a magnitude relation between the analog voltage and the divided voltage of the reference voltage E1. As a result, in a case where the vehicle-originated signal reaches a predetermined value, the first differential amplifying section 306 inverts the output.

In addition, the second differential amplifying section 308 amplifies the output from the first differential amplifying section 306 with amplification factors determined by resistors Ra, Rb, Rc, and Rd, thereby supplying the outputs to the corresponding switching regulator 204. Each of the switching regulators 204 supplies to the corresponding semiconductor light source 102 current corresponding to the output from the second differential amplifying section 308.

According to the embodiment, a threshold value at which illumination of each of the semiconductor light sources 102 is started can be adjusted in accordance with the vehicle-originated signal by means of adjusting the divided voltage of the reference voltage E1. In addition, a rate of a variation in the luminous energy of the semiconductor light source 102 corresponding to a variation in the vehicle-originated signal can be adjusted by means of adjusting the amplification factor of the second differential amplifying section 308.

For instance, when the divided voltage of the reference voltage E1 of any one of the signal output sections 310 is set to 1 V, in a case where the analog voltage output from the analog voltage signal generation section 304 becomes 1 V or higher, the luminous energy control section 104 causes the semiconductor light source 102 corresponding to the signal output section 310 to illuminate. In addition, when the analog voltage increases gradually, the luminous energy control section 104 causes the luminous energy of the semiconductor light source 102 to increase gradually. In addition, for instance, when the inverting input terminal of the operational amplifier of the first differential amplifying section 306 is grounded, and the divided voltage of the reference voltage E1 is set to 0 V, the luminous energy control section 104 causes the semiconductor light source 102 to illuminate in a case where the analog voltage becomes 0 V or higher.

Meanwhile, the first differential amplifying section 306 or the second differential amplifying section 308 may further include a capacitor. The capacitor is connected parallel to a feedback resistor of the operational amplifier. In this case, the luminous energy of the semiconductor light source 102 can be made to change while being delayed with respect to the change in the vehicle-originated signal by means of including a delay in control. In addition, by virtue of the above, the luminous energy of each of the semiconductor light sources 102 can be controlled while incorporating the concept of time.

Furthermore, in another embodiment, the analog voltage signal generation section 304 and the signal output section 310 may be constructed from a microcomputer. In this case, the microcomputer may output a signal which is analogous to the output from the second differential amplifying section 308 by use of, for instance, a D/A converter.

Figure 6A:
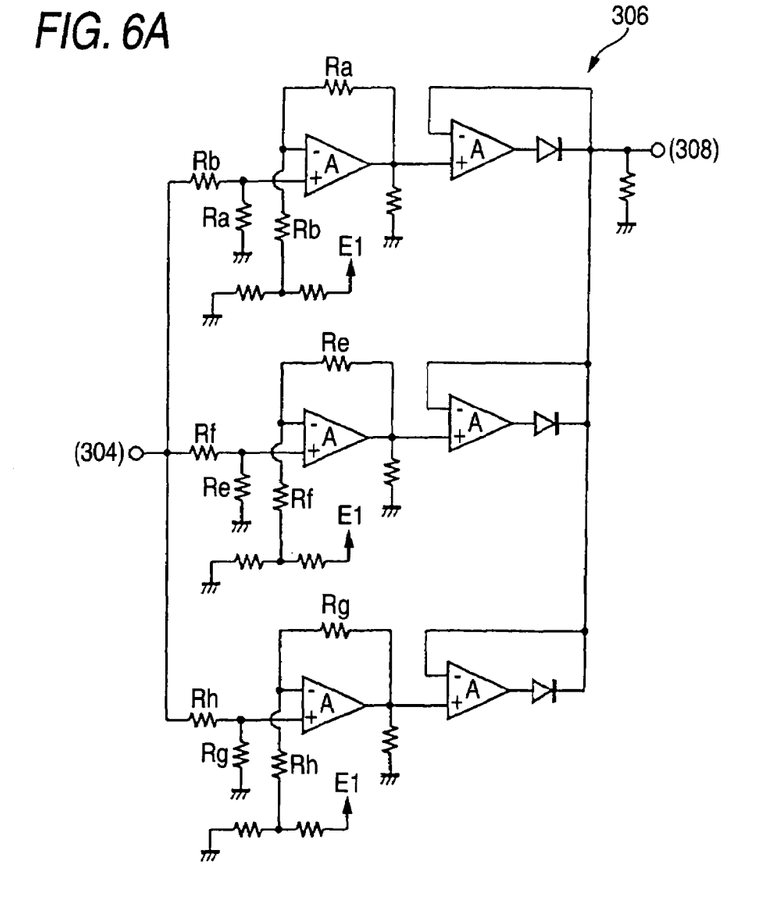
FIGS. 6A and 6B are views showing another example configuration of a first differential amplifying section 306 in accordance with an embodiment of the invention.
Figure 6B:
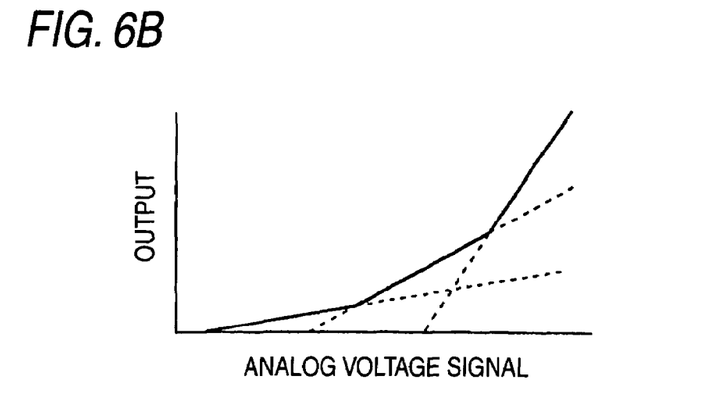

FIGS. 6A and 6B show another example configuration of the first differential amplifying section 306. The first differential amplifying section 306 of the embodiment includes a group constituted of operational amplifiers connected in parallel as shown in FIG. 6A. The first amplifier in each group receives a divided voltage of the reference voltage E1 having been divided at a ratio, which differs from group to group, through an inverting input terminal. The first operational amplifier is connected to the second differential amplifying section 308 by way of a second amplifier and a diode.

In this case, the first operational amplifier in each of the groups inverts an output at a timing which differs from group to group in accordance with the changes in the analog voltage output from the analog voltage signal generation section 304. In this case, the second differential amplifying section 308 outputs a signal for changing the slope stepwise as shown in FIG. 6B. Accordingly, for instance, in the same manner as in the control having been described by reference to FIG. 4B, the ratio at which the luminous energies of the semiconductor light sources 102 are caused to change can be rendered as follows: to be small in a case where current supplied to the semiconductor light sources 102 is small, and, in contrast, to be large in a case where the current is large.

Figure 7:
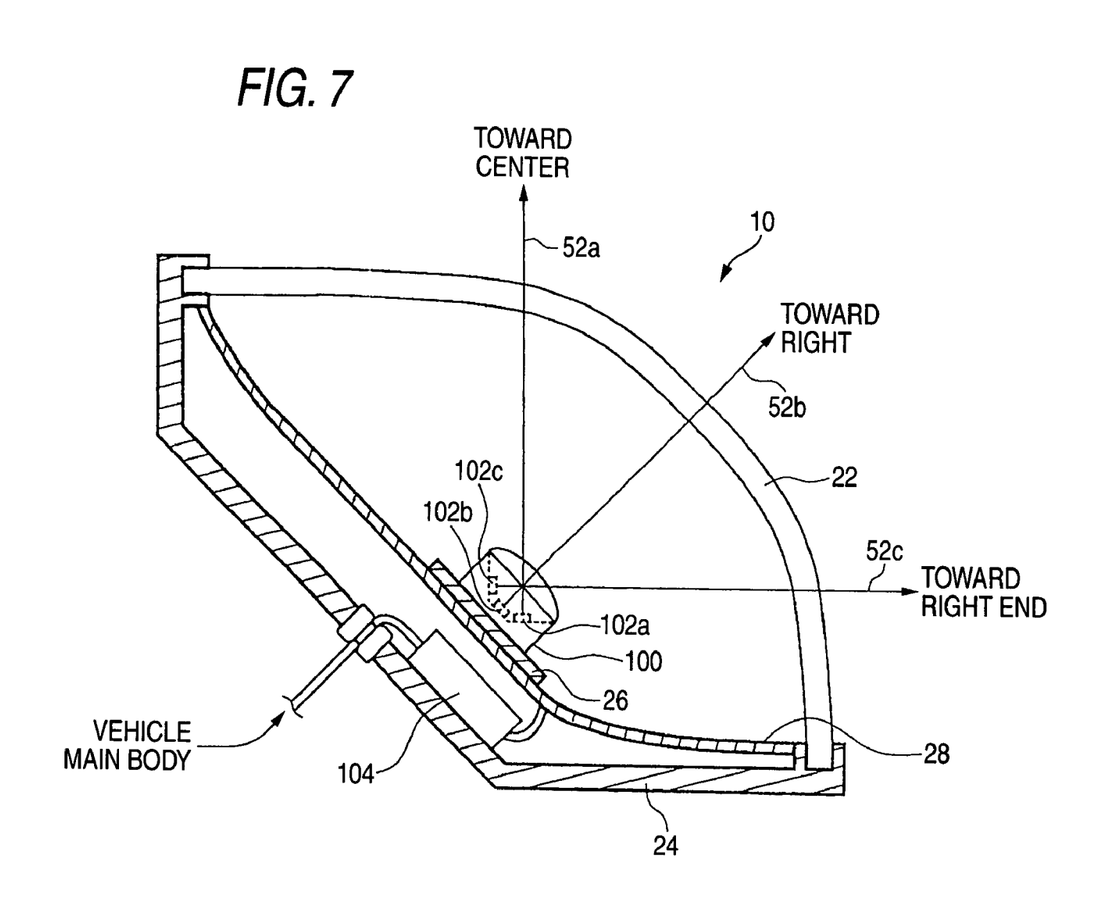
FIG. 7 is a view showing another example configuration of the vehicle lamp 10 in accordance with an embodiment of the invention.

FIG. 7 shows another example configuration of the vehicle lamp 10. Meanwhile, in all respects other than those described below, elements in FIG. 7 denoted by the same reference numerals as those in FIG. 1 have functions identical with or similar to those in FIG. 1, and repeated descriptions are omitted. In the embodiment, the plurality of semiconductor light sources 102a to 102c are disposed within a single light source module 100 so that illumination directions thereof differ from each other. The plurality of semiconductor light sources 102a to 102c may be configured, with use of a reflection mirror, and the like, so that the respective semiconductor light sources 102a to 102c differ from each other in terms of illumination direction.

Also in this case, the luminous energy control section 104 changes the luminous energy of each of the plurality of semiconductor light sources 102a to 102c in accordance with the vehicle-originated signal. Therefore, also in the embodiment, light distribution of the vehicle lamp 10 can be changed without changing orientations of the semiconductor light sources 102, and the like. Therefore, the embodiment can also provide the vehicle lamp 10 which is of high commercial value at low cost.

Figure 8:
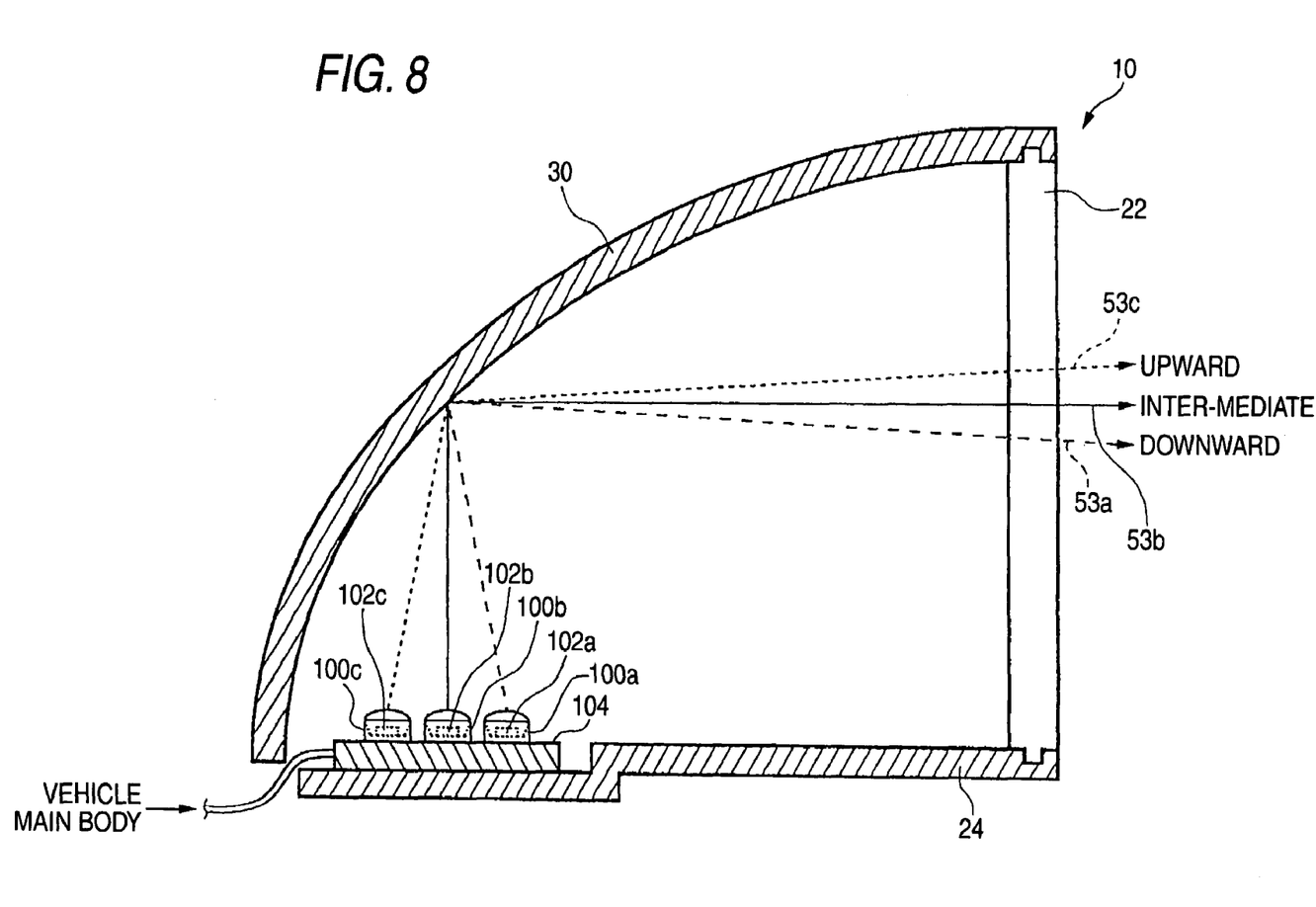
FIG. 8 is a vertical cross-sectional view showing yet another example configuration of the vehicle lamp 10 in accordance with an embodiment of the invention.

FIG. 8 is a vertical cross-sectional view showing yet another example of the configuration of the vehicle lamp 10. Meanwhile, in respects other than those described below, the elements in FIG. 8 denoted by the same reference numerals as those in FIG. 1 have functions identical with or similar to those in FIG. 1, and repeated descriptions are omitted. The vehicle lamp 10 includes the plurality of light source modules 100a to 100c, the outer lens 22, the lamp body 24, a reflection mirror 30, and the luminous energy control section 104. The reflection mirror 30 is an example of an optical system disposed for common use by the plurality of the semiconductor light source 102a to 102c, and illuminates light emitted from each of the plurality of semiconductor light sources 102a to 102c forward of the vehicle. The plurality of light source modules 100a to 100c are fixed on the luminous energy control section 104 with light-emitting surfaces thereof facing upward. The light source module 100a is fixed at a position closer to the front of the vehicle than is the light source module 100b. The light source module 100c is fixed at a position closer to the rear of the vehicle than is the light source module 100b. As described above, the respective light source modules 100a to 100c are fixed at positions which differ from each other with respect to the reflection mirror 30. Accordingly, the reflection mirror 30 radiates light emitted from each of the light source modules 100a to 100c in different directions forward of the vehicle. As a result, also in the embodiment, the respective light source modules 100a to 100c differ from each other in terms of illumination direction of emitted light.

As shown by an arrow 53a, the semiconductor light source 102a radiates light downward and ahead of the vehicle. As shown by an arrow 53c, the semiconductor light source 102c radiates light upward and ahead of the vehicle. As shown by an arrow 53b, the semiconductor light source 102b radiates light in an intermediate direction between arrow 53a and arrow 53c ahead of the vehicle. The outer lens 22 in the embodiment is, for instance, a clear translucent lens. The lamp body 24, the outer lens 22, and the reflection mirror 30 constitute a lamp chamber of the vehicle lamp 10, and house the plurality of light source modules 100a to 100c therein.

The luminous energy control section 104 receives, as the vehicle-originated signal, a signal indicating a vehicle speed. In this case, the luminous energy control section 104 changes the ratio among luminous energies emitted from the respective semiconductor light sources 102a to 102c in accordance with the vehicle speed. As a result, the vehicle lamp 10 can change light distribution in accordance with the vehicle speed. Therefore, according to the embodiment, the vehicle lamp 10 contributes to high safety.

Figure 9A:
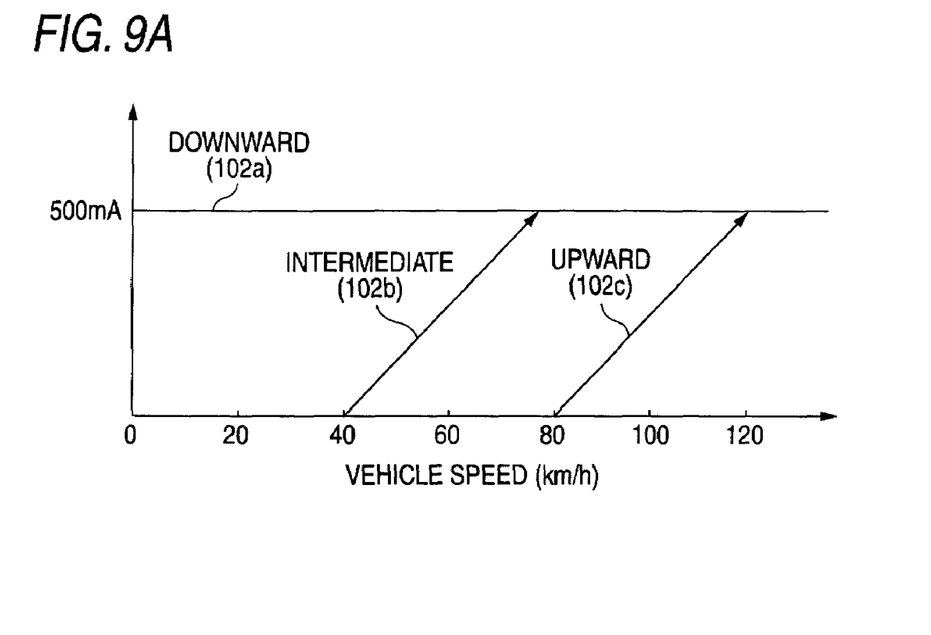
FIGS. 9A and 9B are views explaining example operations of the vehicle lamp 10 shown in FIG. 8.
Figure 9B:
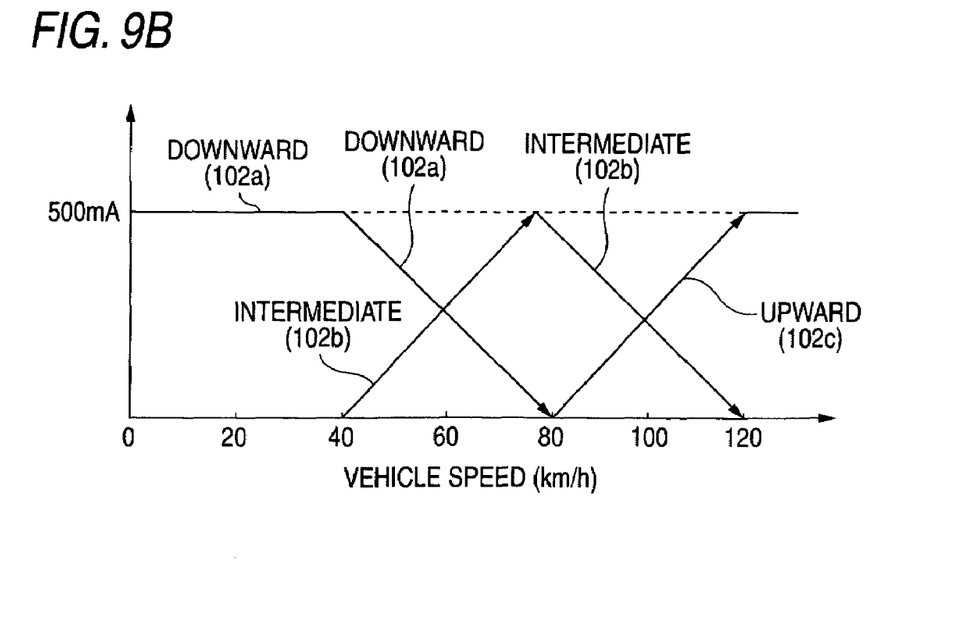

FIGS. 9A and 9B are views explaining example operations of the vehicle lamp 10 described in FIG. 8. A maximum current value of the semiconductor light source 102 in the embodiment is approximately 700 mA. Accordingly, with respect to a current value of 500 mA or lower, which is sufficiently small compared to the maximum current value, each of the semiconductor light sources 102 emits light whose luminous energy is substantially proportional to the current value. For instance, in a case shown in FIG. 9A, when the vehicle speed falls within a range of 0 to 40 km/h, the luminous energy control section 104 causes the semiconductor light source 102a to illuminate with a current of 500 mA, and the semiconductor light sources 102b and 102c to extinguish. When the vehicle speed falls within a range of 40 to 80 km/h, the luminous energy control section 104 causes current to be supplied to the semiconductor light source 102b which radiates light in the intermediate direction to gradually increase to 500 mA, which is a predetermined upper limit current value, in accordance with gradual increase in the vehicle speed. The semiconductor light source 102b illuminates with the thus-increasing luminous energy in accordance with the current. Meanwhile, the luminous energy control section 104 maintains at 500 mA current to be supplied to the semiconductor light source 102a, and at 0 mA current to be supplied to the semiconductor light source 102c.

When the vehicle speed falls within a range of 80 to 120 km/h, the luminous energy control section 104 causes current to be supplied to the semiconductor light source 102c, which radiates light upward, to gradually increase to a value corresponding to the upper limit current value in accordance with a gradual increase in the vehicle speed. Meanwhile, the luminous energy control section 104 maintains at 500 mA current to be supplied to the other semiconductor light sources 102a and 102b, respectively. In a case where the vehicle speed is greater than or equal to 120 km/h, the luminous energy control section 104 maintains at 500 mA current to be supplied to the semiconductor light sources 102a to 102c.

In addition, in a case shown in FIG. 9B, when the vehicle speed falls within a range of 40 to 80 km/h, the luminous energy control section 104 causes current to be supplied to the semiconductor light source 102b to gradually increase to 500 mA, which is the predetermined upper limit current value, in accordance with a gradual increase in vehicle speed; and current to be supplied to the semiconductor light source 102a to gradually decrease to 0 mA in accordance with the gradual increase in vehicle speed. Accordingly, when the vehicle speed falls within a range of 40 to 80 km/h, the semiconductor light source 102a radiates light of luminous energy that decreases gradually in accordance with the vehicle speed; and the semiconductor light source 102b radiates light of luminous energy that increases gradually in accordance with the vehicle speed. Meanwhile, the luminous energy control section 104 maintains at 0 mA current to be supplied to the semiconductor light source 102c.

In addition, when the vehicle speed falls within a range of 80 to 120 km/h, the luminous energy control section 104 causes the luminous energy of the semiconductor light source 102c to gradually increase to that corresponding to the upper limit current value in accordance with a gradual increase in vehicle speed; and current to be supplied to the semiconductor light source 102b to gradually decrease to 0 mA in accordance with the gradual increase in vehicle speed. Accordingly, when the vehicle speed falls within a range of 80 to 120 km/h, the semiconductor light source 102b radiates light of luminous energy that decreases gradually in accordance with an increase in vehicle speed; and the semiconductor light source 102c radiates light of luminous energy that increases gradually in accordance with the increase in vehicle speed. Meanwhile, the luminous energy control section 104 maintains at 0 mA current to be supplied to the semiconductor light source 102a. In a case where the vehicle speed is greater than or equal to 120 km/h, the luminous energy control section 104 maintains at 500 mA current to be supplied to the semiconductor light source 102c, and at 0 mA current to be supplied to the semiconductor light sources 102a and 102b. As a result, the change in light distribution of the vehicle lamp 10 can be rendered smooth.

Heretofore, the invention has been described on the basis of the embodiments; however, the scope of the invention is not limited to the embodiments as set forth. As is apparent to one skilled in the art, various changes and modifications can be applied to the embodiments. Also, as is apparent from the scope of the invention as set forth in the appended claims, the scope of the invention may also encompass modes to which such changes and modifications are added.

What is claimed is:

1. A vehicle lamp for use in a vehicle, comprising:
a plurality of semiconductor light sources which differ from each other in terms of illumination direction;
an optical system disposed for common use by the plurality of semiconductor light sources; and
a luminous energy control section for changing a ratio among luminous energies emitted by the respective semiconductor light sources in accordance with a vehicle-originated signal output from the vehicle, wherein
the luminous energy control section further changes a gradient of a variation of luminous energy emitted by each respective semiconductor light sources in accordance with a variation of the vehicle-originated signal such that the semiconductor light sources provide non-linear graduated illumination.

2. The vehicle lamp according to claim 1, wherein the luminous energy control section changes the ratio among luminous energies in accordance with a rotation angle of a steering wheel of the vehicle upon receipt of the vehicle-originated signal, wherein the vehicle-originated signal indicates the rotation angle.

3. The vehicle lamp according to claim 1, wherein the luminous energy control section changes the ratio among luminous energies in accordance with a vehicle speed upon receipt of the vehicle-originated signal, wherein the vehicle-originated signal indicates the vehicle speed.

4. The vehicle lamp according to claim 1, wherein at least a region of the optical system changes directions of light beams from the respective semiconductor light sources.

5. The vehicle lamp according to claim 1, wherein the luminous energy control section changes the ratio among luminous energies in accordance with a vehicle driving condition upon receipt of the vehicle-originated signal, wherein the vehicle-originated signal indicates one or more of the group consisting of a turn signal, wheel speed, vehicle height, vehicle posture, and exterior luminance.

6. The vehicle lamp according to claim 1, wherein the luminous energy control section for changing a ratio among luminous energies emitted by the respective semiconductor light sources is in accordance with a combination of vehicle-originated signal outputs from the vehicle.

7. A method for changing a ratio of luminous energies comprising:
receiving a vehicle-originated signal;
controlling the ratio of luminous energies emitted by the respective semiconductor light sources in accordance with the vehicle-originated signal;
illuminating a plurality of semiconductor light sources; and
changing a gradient of a variation of luminous energy emitted by each respective semiconductor light source in accordance with a variation of the vehicle-originated signal such that the semiconductor light sources provide non-linear graduated illumination.

* * * * *